United States Patent [19]

Deutsch

[11] 4,330,813
[45] May 18, 1982

[54] ILLUMINATING DEVICE FOR LARGE SCREEN

[75] Inventor: Jean-Claude Deutsch, Grenoble, France

[73] Assignee: Commissariat a l'Energie Atomique, Paris, France

[21] Appl. No.: 209,137

[22] Filed: Nov. 21, 1980

[30] Foreign Application Priority Data

Dec. 7, 1979 [FR] France .................... 79 30064

[51] Int. Cl.³ ............................................. F21V 5/00
[52] U.S. Cl. ....................................... 362/244; 362/97; 362/217; 340/763; 340/765; 340/783; 340/784; 350/345
[58] Field of Search ................... 362/97, 31, 217, 244; 340/705, 765, 763, 784, 783; 350/330, 335, 345

[56] References Cited

U.S. PATENT DOCUMENTS

| | | | |
|---|---|---|---|
| 3,840,695 | 10/1974 | Fischer | 350/345 |
| 3,869,195 | 3/1975 | Aldrich | 350/345 |
| 4,257,041 | 3/1981 | Masucci | 340/705 |
| 4,263,594 | 4/1981 | Masucci | 350/345 |

*Primary Examiner*—Donald P. Walsh
*Attorney, Agent, or Firm*—Pearne, Gordon, Sessions, McCoy & Granger

[57] ABSTRACT

Illuminating device for a large screen making it possible to uniformly illuminate said screen by means of a light arriving at a low angle of incidence $\theta$, wherein it comprises n.p light sources and n.p optical focusing elements in matrix form, as well as means for ensuring that the light beams from each source do not encounter the optical elements associated with the other sources.

11 Claims, 4 Drawing Figures

ILLUMINATING DEVICE FOR LARGE SCREEN

BACKGROUND OF THE INVENTION

The present invention relates to an illuminating device for a large screen. This device makes it possible to uniformly illuminate any large surface by means of light arriving at a low angle of incidence. More particularly it makes it possible to illuminate a display screen of the liquid crystal or other type.

At present displays on large screens are produced by projection from a cell, e.g. a liquid crystal cell on to frosted glass forming a screen. The KOEHLER device for illuminating the screen is constituted by a light condenser, formed by a convergent field lens, whose surface area is equal to or exceeds that of the cell to be illuminated, and a light source positioned, for example, in the lens focus. The presently used condensers have a focal distance at least equal to the lens diameter. Therefore the depth dimension of the device is approximately the same as that of the screen, which in the case of a large screen leads to a voluminous device.

BRIEF SUMMARY OF THE INVENTION

The invention aims at obviating these disadvantages and particularly at considerably reducing the overall dimensions of the illuminating device.

The invention relates to an illuminating device for a large screen permitting the uniform illumination of said screen by means of a light arriving at a low angle of incidence $\theta$. This device comprises n.p light sources and n.p optical focusing elements arranged in matrix form, as well as means for preventing the light beams from each source reaching the optical elements associated with the other sources.

According to another feature of the invention the means used for preventing the light beams from each source reaching the optical elements associated with the other sources are constituted by diaphragms.

According to another variant of the invention the n.p optical elements are constituted by n beam splitters and p real lenses, each associated with a real light source. These n beam splitters form an angle of 45° with the screen and are equidistantly positioned with respect to their neighbours, whilst the p real lenses are positioned perpendicular to the screen and each of them is associated with a real light source.

In a first type of device according to this variant of the invention the beam splitters have the same reflection coefficient. Moreover, the mirror is positioned behind the final beam splitter and reflects on to itself the light beam emerging therefrom. A mirror is also positioned behind the system of beam splitters and reflects back on to themselves the light beams emerging from the rear face of the beam splitters.

In a second type of device according to the same variant the final beam splitter is completely reflecting and the other have different reflection coefficients such that the light intensity reflected by each of the beam splitters on to the screen is the same.

According to another variant of the invention n.p optical elements are constituted by n.p real lenses associated with n.p real light sources.

According to another feature of the invention the light sources are obtained by means of fluorescent tubes.

According to another feature of the invention the angle of incidence $\theta$ at which the screen is illuminated is selected in such a way that $$\theta = d/2f$$

in which d represents the diameter of the sources and f the focal distance of each real lens.

BRIEF DESCRIPTION OF THE DRAWINGS

Other features and advantages of the invention can be gathered from the following description of a non-limitative embodiment and with reference to the attached drawings, wherein show.

DETAILED DESCRIPTION OF THE PREFERRED EMBODIMENTS

Figure 1:
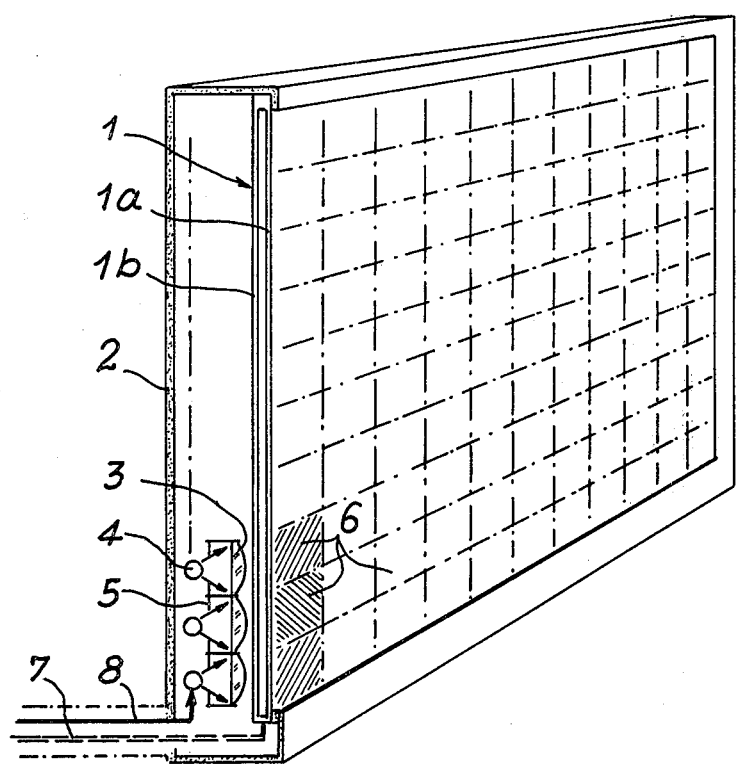
FIG. 1 diagrammatically a display screen illuminated by means of a device according to the invention.

FIG. 1 shows a display screen, e.g. a liquid crystal screen, illuminated by means of the device according to the invention. The display screen 1 and the screen illuminating device are contained in a rigid box or case. This case has a front face 1a which is the actual display screen and a rear face 2, forming the back of the case. The case is shaped like a rectangular parallepiped and has only a limited thickness. The face 1a of display screen 1 is of frosted glass and permits the diffusion of light. Face 1b, made from transparent glass, forms the back of the screen. Between the screen 1 and the rear face 2 of the case are provided n.p convergent lenses 3 or condensers arranged in matrix form and each illuminated by a light source 4 positioned, for example, in the lens focus. A diaphragm 5 associated with each source 4 limits the light field of the corresponding lens and makes it possible to prevent light beams from said source reaching the lenses associated with the other sources. This device makes it possible to illuminate a small element 6 of face 1a of screen 1. Reference numeral 7 represents a supply cord for information for realizing the display on the screen, whilst reference numeral 8 corresponds to a power supply lead for the light sources 4.

The electrical system, such as e.g. electrodes, permitting the sensitization inter alia of liquid crystals, is positioned, like the liquid crystals, between faces 1a and 1b of the screen and is not shown in the drawings. This system does not form part of the invention and will not be described.

Figure 2:
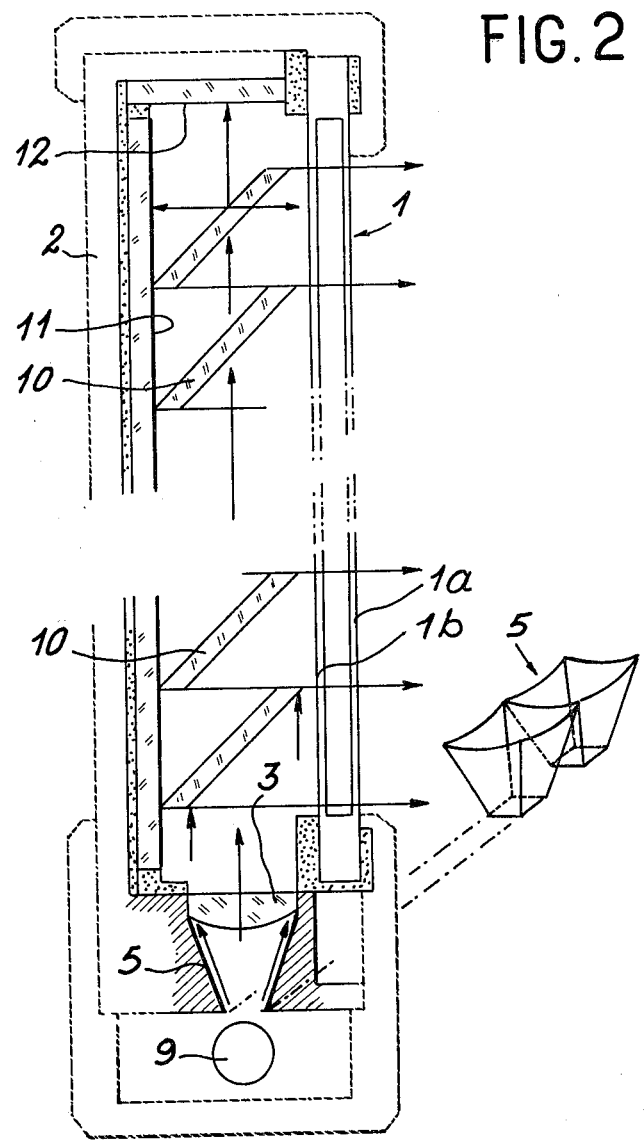
FIG. 2 diagrammatically and in accordance with a second embodiment a screen illuminating device according to the invention.

FIG. 2 shows a second embodiment of the invention. To make it easier to see the various components forming the display device the dimensions of the case and in particular its thickness have not been respected. In this embodiment the p real light sources are obtained by means of a fluorescent tube 9. This tube, which extends over the entire length of the screen, has a diameter which is a function of the illumination conditions which it is desired to obtain on screen face 1a. The light beams from each real light source are limited by a pyramidal diaphragm 5 and then strike the real convergent lens 3. The light from the said convergent lens passes through n beam splitters 10 positioned at 45° with respect to screen 1 and extending over the entire length of the latter. Each beam splitter 10 reflects part of the light on to display screen 1, whilst the light transmitted by beam splitter 10 reaches the other beam splitters arranged equidistantly with respect to one another. Part of the transmitted light strikes mirrors 11 and 12, making it possible to reflect the light towards the beam splitters 10 or screen 1. Mirror 11 is positioned parallel to screen 1 and is joined to the rear face 2 of the case, whilst mirror 12 is positioned behind the final beam splitter 10 so as to be perpendicular to the screen. The device incorporating the two mirrors 11 and 12 and the n beam splitters 10 constitutes n virtual screen illuminating devices which combine with the p real devices described hereinbefore. This leads to n.p screen illuminating devices arranged in matrix form. In this embodiment the light intensity received by each beam splitter is dependent on the position of the latter with respect to the others. Thus, there must be a certain relationship between the reflection coefficients to permit uniform illumination of the screen. On using light polarized parallel to the plane of incidence calculation has shown that there is a reflection coefficient value such that it is the same for each beam splitter and illumination is uniform over the screen. Thus, it is possible to use n identical beam splitters 10.

Figure 3:
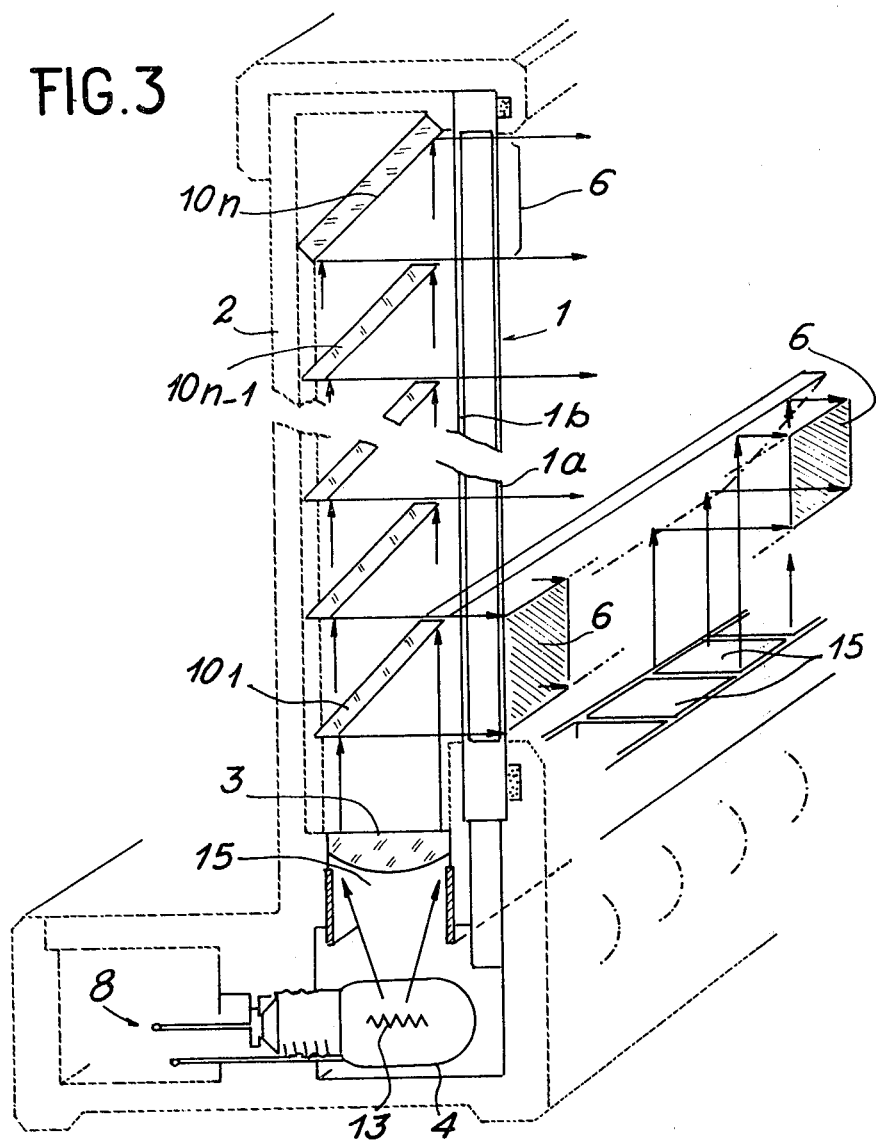
FIG. 3 diagrammatically according to a third embodiment a screen illuminating device according to the invention.

FIG. 3 shows a third embodiment of the screen illuminating device according to the invention. In this embodiment the p real light sources 4 are represented by filament sources 13. As previously the surface of the filament is a function of the lighting conditions which it is desired to obtain on screen face 1a. Reference numeral 8 represents the power supply system for the light source 4 with filament 13. Each light beam from lamps 4 is limited by a straight diaphragm 15. This light beam is then condensed by means of a real convergent lens 3. The light from lens 3 is in part reflected towards face 1a of the screen by n beam splitters $10_1$ to $10_n$, positioned in the manner described hereinbefore. The reflection coefficient of these n beam splitters differs for each of the latter. The reflection coefficient is such that the same light intensity is reflected on to the screen by each beam splitter. Under these conditions the last beam splitter $10_n$ has a reflection coefficient close to 1 and this totally reflecting beam splitter $10_n$ can be a mirror. Under these conditions the light from the p real illuminating devices and reflected by n beam splitters seems to come from n.p illuminating devices arranged in matrix form.

The light intensity received by each beam splitter is dependent on the position thereof with respect to the others. Consequently there must be a certain relationship between the different reflection coefficients to bring about uniform illumination of the screen.

$p_i$ being the reflection coefficient of one beam splitter and $p_{i+1}$ the reflection coefficient of the following beam splitter it is possible to show that:

$$p_{i+1} = \frac{p_i}{1 - i\, p_i}$$

Figure 4:
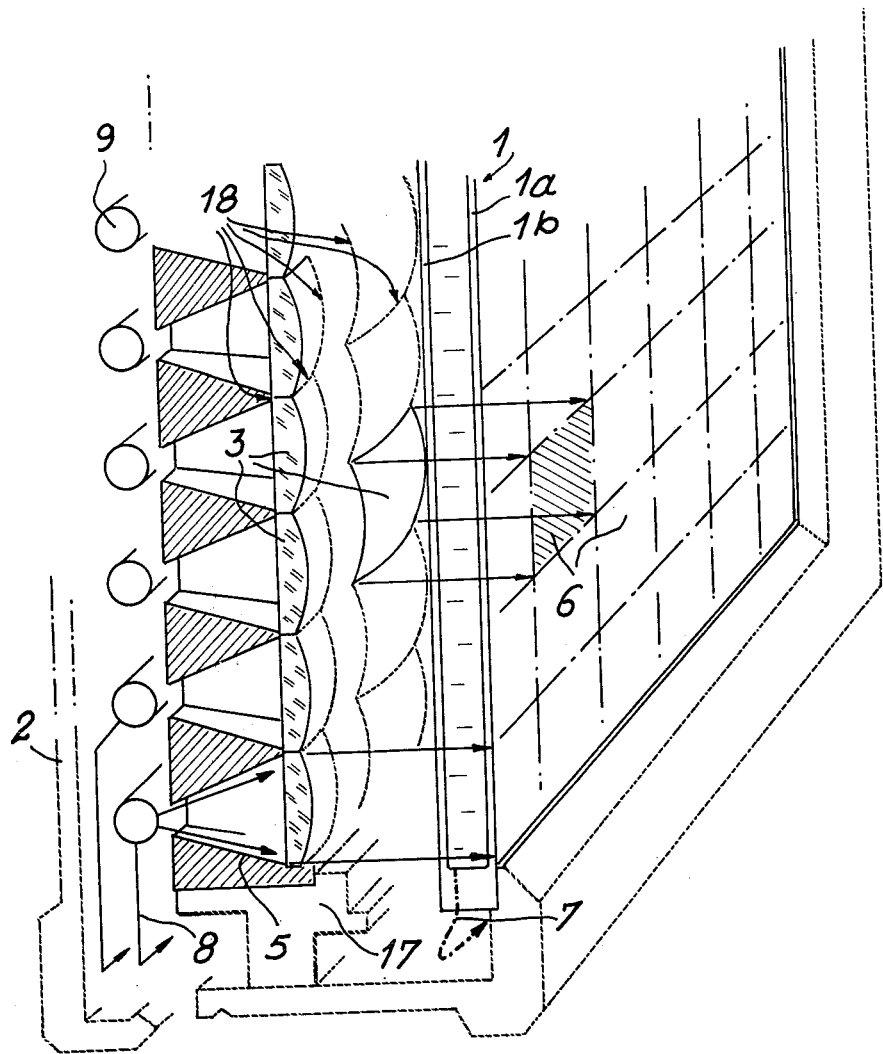
FIG. 4 diagrammatically and according to a fourth embodiment a screen illuminating device according to the invention.

Therefore for n beam splitters the different reflection coefficients are
for the first splitter: $p_1 = 1/n$
for the ith splitter: $p_1 = 1/n - i$
for the last splitter: $p_n = 1$ FIG. 4 shows a fourth embodiment of the screen illuminating device according to the invention. It is clear that the case proportions are not always respected. The n.p light sources are represented by n fluorescent tubes 9 extending over the entire screen length. The diameter of these tubes is also a function of the lighting conditions which it is desired to obtain on the screen face 1a. The n.p light beams from these tubes are limited by n.p pyramidal diaphragms 5 and said n.p light beams are condensed by means of n.p real convergent lenses 3 which are joined to one another. The lenses are positioned parallel to the screen in order to uniformly illuminate the latter. The rigidity of the case and the parallelism of faces 1 and 2 thereof are obtained by means of a metal support 17. Reference numeral 18 indicates the contact area between each convergent lens.

As a variant of the embodiment of FIG. 4 the n fluorescent tubes can be replaced by a fluorescent or electroluminescent panel.

No matter what embodiment of the device is used the frosted glass face 1a of the screen is illuminated by means of n.p illuminating devices, each formed by a source and a convergent lens. As the size of a lens fixes a lower limit for it focal distance, the use of n.p illuminating devices instead of a single device makes it possible to divide the focal distance of this device of the two numbers n and p, with a fixed aperture. Moreover as the size of the illuminating device is a function of the focal distance of the lens, the use of n.p lenses makes it possible to reduce the size to the same extent.

The reduction of the overall dimensions of the illuminating device in this way makes it possible to manufacture a large screen according to the invention kept in a small thickness case and containing the complete illuminating device for said screen.

The uniform illumination of such a screen by n.p illuminating devices imposes certain conditions on the illuminating device. Thus, the use of straight or pyramidal diaphragms making it possible to limit the field of the associated lens, prevents a light beam from the lens from meeting beams from other lenses.

In the particular case of a light source positioned in the lens focus, light beams leave the lens parallel to the optical axis. Under these conditions the extreme beams from joined lenses are emitted in parallel and in proximity to one another without meeting.

To obtain a uniform lighting of the screen it is also necessary that the contact area between two adjacent lenses is below a certain value (approximately below 80μ) in such a way that the extreme light beams of two adjacent lenses strike the screen with a spacing below that required by the resolving power of the eye.

This problem is simplified by positioning the light source in the lens focus, but this in no way excludes the other possible positions for said light source, which means that it must be possible for the light beams to strike the screen at a given small field angle $\theta$. This field angle must at the maximum be equal to the value fixed by the operation of the liquid crystal call. This field angle is obviously dependent on the size of the source and the focal distance of the associated lens. They must be chosen in an appropriate manner. For example when, in accordance with the fourth embodiment of the invention the n fluorescent tubes are used as the light sources, together with the n.p real lenses the field or incidence angle $\theta$ under which the screen is illuminated is equal to d/2f in which d represents the diameter of the tubes and f the focal distance of each lens.

The advantages of the device will become more apparent from the following figures.

To illuminate a 9 cm wide, 13 cm long display screen it has hitherto been necessary to use a condenser with a focal distance or size of 16 cm with a 40 mm diameter source and a field angle of ±8°. When using n.p lenses with a focal distance of 10 mm and n.p light sources with a diameter of 3 mm in accordance with the invention a depth dimension of 10 mm is obtained for the same screen as hereinbefore.

To illuminate a 10 cm wide, 13 cm long screen it has hitherto been necessary to use 13 times 10 convergent lenses with a 1 cm side length and a focal distance of 2 cm. The field angle under which the screen is illuminated is ±8°. Under these conditions the tubes used according to the fourth embodiment of the invention have a diameter of 5.6 mm.

This second example illustrates the above formula.

The device according to the invention can advantageously be used in a small size, completely informatized system which can be used in the home for replacing telephone directories.

I claim:

1. An illuminating device for a large single display screen for uniformly illuminating said screen from the rear by means of light arriving at a low angle of incidence $\theta$, said screen having a translucent front face and a transparent rear face between which an electrically sensitized display material is interposed, wherein said device comprises n.p light sources and n.p optical elements in matrix form, the optical elements focusing directly on the screen the light coming from the respective light sources, and means for ensuring that the light beams from each source do not encounter the optical elements associated with the other sources.

2. A device according to claim 1, wherein the means used for preventing the light beams from each source encountering the optical elements associated with the other sources are constituted by diaphragms.

3. A device according to claims 1 or 2, wherein the n.p optical elements are constituted by n beam splitters and p real lenses, each associated with a real light source.

4. A device according to claim 3, wherein each of the n beam splitters forms an angle of 45° with the screen and is equidistantly positioned relative to its neighbours.

5. A device according to claim 3, wherein the p real lenses are positioned perpendicular to the screen and each of them is associated with a real light source.

6. A device according to claim 3, wherein the n beam splitters have the same reflection coefficient, the final beam splitter is followed by a mirror which reflects on to itself the light beam from the final beam splitter and a second mirror positioned behind the system of beam splitters reflects on to themselves the light beams reflected on the rear face of the beam splitters.

7. A device according to claim 3, wherein the n beam splitters have in each case a different reflection coefficient, so that the same light intensity is reflected by each of the beam splitters on to the screen, the final beam splitter being completely reflecting.

8. A device according to claims 1 or 2, wherein the n.p optical elements are constituted by n.p real lenses associated with n.p real light sources.

9. A device according to claim 1, wherein the real light sources are obtained by means of fluorescent tubes.

10. A device according to claim 1, wherein the angle of incidence $\theta$ under which the screen is illuminated is chosen in such a way that $\theta = d/2f$ in which d represents the diameter of the sources and f the focal distance of each real lens.

11. A device according to claim 4, wherein the p real lenses are positioned perpendicular to the screen and each of them is associated with a real light source.

* * * * *